April 24, 1956    H. R. WATSON ET AL    2,742,824
MACHINE FOR ACCURATELY SHAPING THE SURFACE
OF PART OF AN AIRCRAFT WING
Filed April 17, 1953    2 Sheets-Sheet 1

INVENTORS
H. R. WATSON &
F. H. WARD
BY
Mawhinney & Mawhinney
ATTYS.

April 24, 1956 H. R. WATSON ET AL 2,742,824
MACHINE FOR ACCURATELY SHAPING THE SURFACE
OF PART OF AN AIRCRAFT WING
Filed April 17, 1953 2 Sheets-Sheet 2

INVENTORS
H. R. WATSON &
F. H. WARD
BY
Mawhinney & Mawhinney
ATTYS.

United States Patent Office 2,742,824
Patented Apr. 24, 1956

2,742,824

MACHINE FOR ACCURATELY SHAPING THE SURFACE OF PART OF AN AIRCRAFT WING

Henry Romaine Watson and Frederick Horace Ward, Coventry, England, assignors to Sir W. G. Armstrong Whitworth Aircraft Limited, Coventry, England Application April 17, 1953, Serial No. 349,398

Claims priority, application Great Britain May 16, 1952

12 Claims. (Cl. 90—13.4)

It is considered likely that a tapered aircraft wing, with straight, co-planar leading and trailing edges, will, in the future, be made with distributed spar flanges having integral stringers made by an extrusion or machining process. The external surface of each of these flanges will form a spanwise part of the profile of the wing, and it is, of course, necessary to provide it with a smooth machined finish of the correct profile.

The main object of the invention is to provide a machine by which this may be ensured, and, moreover, a machine which will operate at a relatively quick rate. In this connection it may be mentioned that it is known to use a ball-ended rotary cutter, following the path laid down by a wooden model of the surface to be cut. A ball-ended cutter, however, produces a somewhat uneven finish, and can only remove the surplus metal or other material of which this part of the wing is to be formed at a very slow rate.

The invention consists in a machine for accurately shaping the surface of a spanwise part of a tapered aircraft wing, the spanwise part being between leading and trailing portions of the wing, in which the spanwise part is carried by a table or other structure adapted to be moved over a stationary base about an axis which is at right-angles to the plane containing the leading and trailing edges of the wing (assuming the spanwise part were in position in the wing) and which passes through the point of intersection of the two lines which would delineate the leading and trailing edges of the wing respectively (on the above-mentioned assumption), the machining being effected by a cylindrical rotary cutter, cutting in a chordwise direction, which is movable in a plane at right-angles to the said plane of the wing and of which the line of cut will at all times lie along straight generating lines uniting related points of the profile at different positions along the spanwise part and converge to intersect said axis, the cutter being regulated in tis movement dependently upon the desired profile by co-acting cam means between the movable structure and a support for the cutter.

In the accompanying drawings, which are very diagrammatic:

Figure 4:
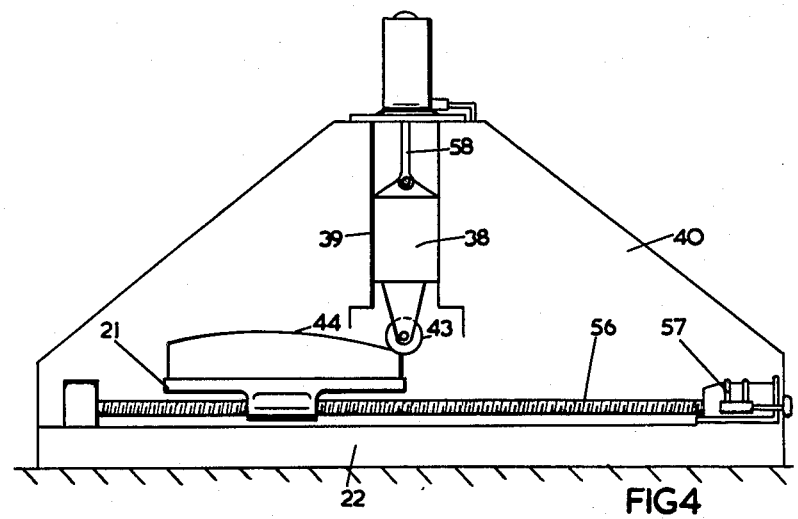
Figure 4 is another elevation, at right-angles to that of Figure 3, indicating a modification in which the weight of the support for the cutter and of the cutter are partly taken by servo means.
Figure 5:
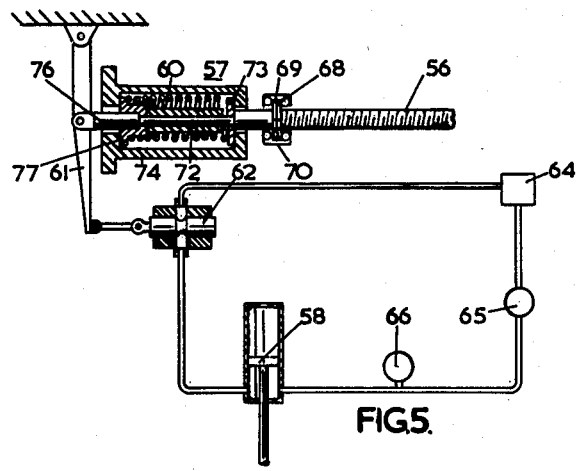

Figure 5 indicates diagrammatically how the servo means of Figure 4 is arranged to operate.

Figure 1:
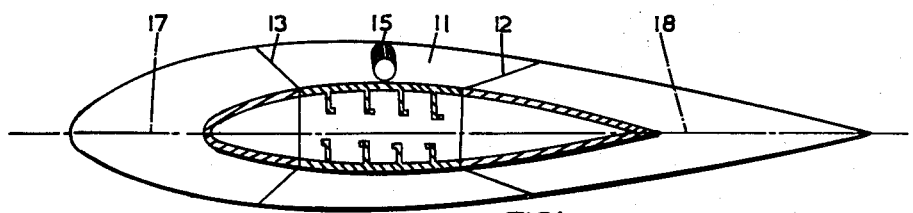
Figure 1 is a sectional end view of a tapered aircraft wing having a spanwise part which is to be machined by means of a cylindrical cutter.

It may be explained that the normal tapered aircraft wing includes a root section and a tip section with straight line generators joining corresponding fractions of the chord at each section between the root and tip sections. It is therefore deduced that, if the spanwise part 11 (between the lines 12 and 13 in Figure 1) is to be machined by means of a cylindrical cutter 15, the line of cut must at all times lie along these generating lines of the profile. The section shows stringers 16 fast with the internal surface of the part 11.

Figure 2:
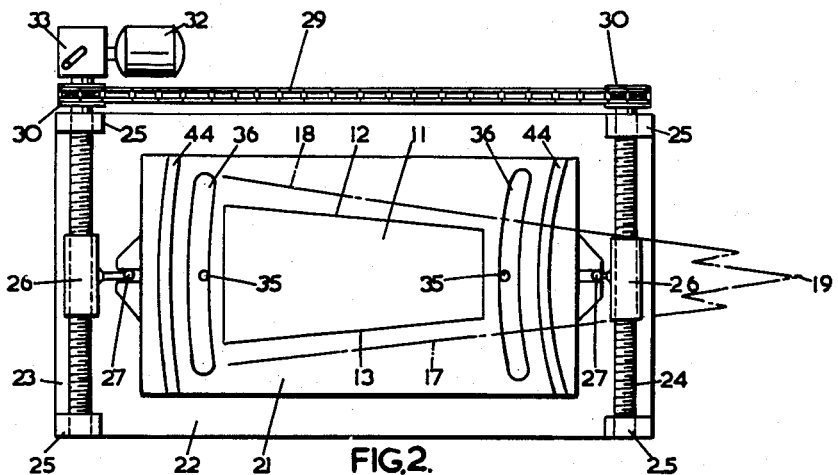
Figure 2 is a plan mainly of the movable structure aforesaid carrying the spanwise part to be machined, the cutter and its support being omitted for the sake of simplicity.

If the leading and trailing edges (indicated at 17, 18) of the wing were produced beyond the tip section they would ultimately intersect one another at a point 19 (Figure 2). In the case of a wing having a constant thickness/chord ratio, all the profile generating lines will pass through this point. If the thickness/chord ratio is not constant, the generating lines will pass through a line which is at right-angles to the plane of the wing and passes through the intersection of the leading and trailing edges.

In carrying out the invention, therefore, it is necessary to move the wing (i. e., the spanwise part 11 of which the surface is to be accurately machined) in such a way that the cutter axis is always parallel to the generator line at the position of contact of the cutter and the part 11.

The spanwise part 11 is therefore mounted in any suitable way (e. g., by clamps, not shown) on a table or other structure 21 which is angularly movable horizontally over a stationary base 22, and such angular movement is arranged to take place about the axis through the intersection of the leading and trailing edges of the wing (i. e., the point 19) which is at right-angles to the plane of the wing. In practice the point 19 will be remote from a machine having the table and base, and this angular movement may be effected by the use of parallel horizontal screws 23, 24, axially located at 25, 25 in the stationary base, differentially driving non-rotatable nuts 26 with arms 27 extending to engage notches at the radially-inner and radially-outer edges (i. e., as regards the point 19) of the movable structure 21. The screws are shown as being interconnected by an endless chain 29 operating on chain wheels 30. For preference these wheels 30 are arranged to give the desired ratio of the differential drive; but, alternatively, and as shown, the screws themselves can have threads of different pitches to give the desired ratio. One of the screws may be driven by an electric motor 32 provided with a control 33.

Radial location relative to the point 19 is effected by means of rollers 35 (Figure 2) on the stationary base engaged in slots 36 in the movable structure 21 which are arcuate about the axis of movement—i. e., the point 19. The slots 36 should be provided by detachable members so that they can be replaced by other slots dependently upon requirements.

A holder 37 for the cutter is carried by the cutter support, shown as a bar 38 parallel to the axis of the cutter. The ends of the bar are slidingly guided in vertical slots (shown only at 39 in Figure 4) formed in uprights 40 of the stationary base. Axial location for the bar is provided by means of a roller 41 on the bar operating in a groove 42 in one of the uprights.

The bar also carries, near the radially-inner and outer ends of the spanwise part, rollers 43 engaged with cam surfaces 44 provided on the movable structure and shaped dependently upon the desired profile of the surface of the spanwise part in a chordwise direction.

Figure 3:
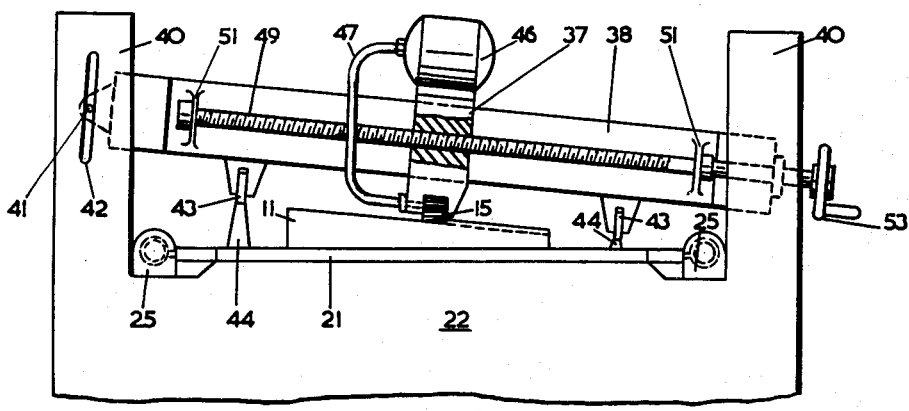
Figure 3 is an elevation showing parts of the stationary base of the machine which are omitted from Figure 2, and showing also the support for the cylindrical cutter.

The cutter holder 37 is shown as carrying an eletcric motor 46 connected to drive the cutter by a flexible shaft 47. The holder can be traversed along the bar 38 by means of a screw 49 having a threaded engagement with the holder and being axially located in brackets 51 of the bar. Figure 3 shows one end of the screw 49 as extending through one of the uprights 40 and provided with a wheel 53 by which it may be turned.

It will be understood that the cutter should be coaxial with the rollers 43, and that its diameter should be of the same order as that of the rollers. Furthermore, the common axis of the cutter and rollers 43 should be parallel to the axis of the traversing screw 49.

Thus, when machining such a spanwise part 11, the cutter holder 37 is positioned along the bar 38 so as first to machine, say, the radially-outer end of the part, the movable structure 21 being positioned relatively to the cutter so that the cutter will machine from a leading or trailing edge of the part—see Figure 4. As the structure is oscillated in one direction about the axis passing through the point 19 the whole of the radially-outer end of the part will be accurately machined in a chordwise direction, the coaction of the cam surfaces 44 and rollers 43 causing the cutter to rise and fall appropriately. The movable structure 21 is then returned to its starting position (Figure 4), and after the screw 49 has been turned to feed the cutter holder 37 appropriately in a radially-inwardly direction as regards the point 19, a further chordwise strip of the surface can be machined. And so on, until the whole length of the surface of the spanwise part has been accurately machined.

In the modification of Figures 4 and 5, 21 again represents the movable structure, 22 the stationary base, 40 one of the uprights, 43 a roller at one end of the supporting bar 38 for the cutter holder 37 (not shown in these figures), and 44 the cam surface for the roller 43. In this modification the weight of the bar 38, the holder 37, and the cutter 15 are taken in part by a servo means which is energised responsively to the axial load, due to the roller rising up the cam surface, imposed on one of the traversing screws, indicated at 56, so that the effort exerted by the screw will be substantially uniform as the cutter rises and falls dependently upon the desired chordwise profile, as determined by the cam surface 44.

Thus, in carrying out this modification, the screw 56, instead of being axially located like the screws 23 and 24 of Figure 2, is mounted for small endwise movement and is provided at one end with a jack control unit 57, the servo means taking the form of a suspending jack 58. The control unit consists of a spring abutment working, against a preloaded compression spring 60, up to a limited movement in either direction. This movement is transferred by a lever 61 to a flow control valve 62 in the circuit of the jack 58, the circuit including a header tank 64 on the return side of the control valve, a hydraulic pump 65 on the delivery side of the header tank, and a hydraulic accumulator 66 interposed between the hydraulic pump and the jack, which latter is connected to the control valve. Thus, in conditions of severe camber (e. g., when the cutter is at one of the longitudinal edges of the spanwise part and is starting a cutting traverse) the resultant axial load on the screw 56 operates by the control valve, through lever 61, to divert oil pressure to the jack to assist in taking some of the gravity load. When the axial load on the screw is reduced the spring 60 returns the control valve to its open position (as actually shown in Figure 5), thus maintaining the rollers 43 in contact with the cam surfaces 44.

In practice, a hydraulic jack and associated control unit 57 are preferably provided for each end of the bar 38 on which the holder for the cutter is slidable.

In the particular form of control unit 57 shown by Figure 5, the screw 56 terminates with a flange 68 adjacent an abutting flange 69, the two flanges being mounted in an axially-movable thrust bearing 70. The flange 69 is fast with a stem 72 which passes slidingly through an abutment flange 73 in a stationary casing 74 and which is pivotally connected at its free end with the lever 61. The free end of the stem has a portion 76 of enlarged section which bears upon an abutment cap 77 through which the stem 72 slidingly passes. The compression spring 60 reacts between the abutment cap 77 and the abutment flange 73. The unit 57 is thus capable of reacting to an axial load on the screw 56 in either direction.

What we claim as our invention and desire to secure by Letters Patent of the United States is:

1. A machine for accurately shaping the surface of a spanwise part of a tapered aircraft wing, said spanwise part being between the leading and trailing portions of the wing, comprising a stationary base, a structure for carrying said spanwise part, means acting on said structure to oscillate it relatively to said base for opposite ends of said structure to describe parallel arcs having a common centre on an axis which is remote from said machine and contains the point of convergence of straight leading and trailing edges of the wing (assuming the spanwise part were in position in the wing), said axis normal to the plane of the wing whereby the oscillation of said structure is about said axis, means supporting a cylindrical cutter for its axis to be directed spanwise of said wing and to be oscillatable about said point of convergence in a plane normal to the plane of said wing, and cam means acting between said structure and the cutter supporting means for oscillating the latter as said structure is oscillated whereby to constrain the cutter to machine said part in the chordwise direction to a tapering aerofoil section.

2. A machine for accurately shaping the surface of a spanwise part of a tapered aircraft wing, said spanwise part being between the leading and trailing portions of the wing, comprising a stationary base, a structure for carrying said spanwise part, parallelly-spaced rotatable screws located axially on said base, a non-rotatable nut on each said screw, respective pivotal interconnections between said nuts and opposite ends of said structure, said screws on rotation to move said nuts differentially in the same direction for opposite ends of said structure to describe parallel arcs having a common centre on an axis which is remote from said machine and contains the point of convergence of straight leading and trailing edges of the wing (assuming the spanwise part were in position in the wing), said axis normal to the plane of the wing whereby the screws and nuts oscillate said structure about said axis, means supporting a cylindrical cutter for its axis to be directed spanwise of said wing and to be oscillatable about said point of convergence in a plane normal to the plane of said wing, and cam means acting between said structure and the cutter supporting means for oscillating the latter as said structure is oscillated by said nuts and screws whereby to constrain the cutter to machine said part in the chordwise direction to a tapering aerofoil section.

3. A machine for accurately shaping the surface of a spanwise part of a tapered aircraft wing, said spanwise part being between the leading and trailing portions of the wing, comprising a stationary base, a structure for carrying said spanwise part, means acting on said structure to oscillate it relatively to said base for opposite ends of said structure to describe parallel arcs having a common centre on an axis which is remote from said machine and contains the point of convergence of straight leading and trailing edges of the wing (assuming the spanwise part were in position in the wing), said axis normal to the plane of the wing whereby the oscillation of said structure is about said axis, rollers on said base engaged with slots in said structure, said slots being parallelly arcuate about said axis to provide radial location for said structure means supporting a cylindrical cutter for its axis to be directed spanwise of said wing and to be oscillatable about said point of convergence in a plane normal to the plane of said wing, and cam means acting between said structure and the cutter supporting means for oscillating the latter as said structure is oscillated whereby to constrain the cutter to machine said part in the chordwise direction to a tapering aerofoil section.

4. A machine for accurately shaping the surface of a spanwise part of a tapered aircraft wing, said spanwise part being between the leading and trailing portions of the wing, comprising a stationary base, a structure for carrying said spanwise part, means acting on said structure to oscillate it relatively to said base for opposite ends of said structure to describe parallel arcs having a common centre on an axis which is remote from said machine and contains the point of convergence of straight leading and trailing edges of the wing (assuming the spanwise part were in position in the wing), said axis normal to the plane of the wing whereby the oscillation of said structure is about said axis, uprights carried by said base, an axially-located bar having its ends slidingly guided in vertical slots in said uprights, a holder on said bar for supporting a cylindrical cutter with its axis parallel to said bar, said bar oscillatable about said point of convergence in a plane normal to the plane of said wing, and cam means acting between said structure and said bar for oscillating the latter as said structure is oscillated whereby to constrain the cutter to machine said part in the chordwise direction to a tapering aerofoil section.

5. A machine, according to claim 4, in which axial location for said bar is provided by means of a roller on the bar operating in a groove in one of the uprights.

6. A machine for accurately shaping the surface of a spanwise part of a tapered aircraft wing, said spanwise part being between the leading and trailing portions of the wing, comprising a stationary base, a structure for carrying said spanwise part and adapted to be moved angularly over said base about an axis which is at right-angles to the plane of the wing (assuming the spanwise part were in position in the wing) and passes through the point of intersection of the two lines which would delineate the leading and trailing edges of the wing respectively, a holder for a cylindrical cutter, said holder holding said cutter for machining the spanwise part in a chordwise direction, said holder slidably carried by the said supporting means, the latter being in the form of an axially-located bar parallel to the axis of the cutter, the ends of said bar being slidingly guided in vertical slots formed in uprights carried by the stationary base, rollers carried by said bar in the regions of the radially-inner and outer ends of the spanwise part, said rollers coaxial with the cutter and engaged with cam surfaces provided on the movable structure, said rollers and cam surfaces regulating the movement of the cutter dependently on the desired profile.

7. A machine for accurately shaping the surface of a spanwise part of a tapered aircraft wing, including a stationary horizontal base, a structure carrying said spanwise part and angularly movable horizontally over said base about a perpendicular axis remote from said machine, a cylindrical cutter with its axis intercepting said perpendicular axis and adapted to take a chordwise cut, a supporting bar for said cutter which is generally parallel to the axis of said cutter and is guided for vertical movement, cams on said base having surfaces shaped to the desired shape of the profile of the spanwise part, rollers carried by said bar and engaged with said cams, said rollers being substantially coaxial with said cutter and of approximately the same diameter, means for traversing the said structure, with the said angular movement, backwards and forwards to enable the cutter to effect said chordwise cut, such that the line of cut will at all times lie along straight generating lines which unite related points of the profile at different positions along the spanwise part and converge to intersect said perpendicular axis, and means for traversing said cutter along said bar for the making of successive chordwise cuts.

8. A machine, according to claim 7, including a servo means for partly taking the weight of said cutter and its supporting bar, and means responsive to the axial load imposed on the traversing means for said structure for responsively energising said servo means so that the effort exerted by the traversing means will be substantially uniform as the cutter rises and falls dependently upon the chordwise profile.

9. A machine, according to claim 8, in which said traversing means includes parallel horizontal screws on said base carrying non-rotatable nuts associated with the appropriate ends of said movable structure, said nuts driven differentially for angularly moving said movable structure, at least one of said screws being mounted for small endwise movement and provided at one end with a control unit, responsive to the axial load on said one screw, for energising said servo means.

10. A machine, according to claim 9, in which said servo means takes the form of a suspending jack, and said control unit includes a spring abutment operating against a pre-loaded compression spring up to a limited movement in either direction, and a control valve operable by this movement in the circuit of the jack.

11. A machine for accurately shaping the surface of a spanwise part of a tapered aircraft wing, said spanwise part being between the leading and trailing portions of the wing, comprising a stationary base, a structure for carrying said spanwise part, means acting on said structure to oscillate it relatively to said base for opposite ends of said structure to describe parallel arcs having a common centre on an axis which is remote from said machine and contains the point of convergence of straight leading and trailing edges of the wing (assuming the spanwise part were in position in the wing), said axis normal to the plane of the wing whereby the oscillation of said structure is about said axis, means supporting a cylindrical cutter for its axis to be directed spanwise of said wing and to be oscillatable about said point of convergence in a plane normal to the plane of said wing, means for feeding said cutter axially, and cam means acting between said structure and the cutter supporting means for oscillating the latter as said structure is oscillated to cause the cutter, when fed, to machine successive chordwise strips of said part to similar aerofoil sections of progressively differing scales.

12. A machine for accurately shaping the surface of a spanwise part of a tapered aircraft wing, said spanwise part being between the leading and trailing portions of the wing, comprising a stationary base, a structure for carrying said spanwise part, means acting on said structure to oscillate it relatively to said base for opposite ends of said structure to describe parallel arcs having a common centre on an axis which is remote from said machine and contains the point of convergence of straight leading and trailing edges of the wing (assuming the spanwise part were in position in the wing), said axis normal to the plane of the wing whereby the oscillation of said structure is about said axis, uprights carried by said base, an axially-located bar having its ends slidingly guided in vertical slots in said uprights, a holder on said bar for supporting a cylindrical cutter with its axis parallel to said bar, said bar oscillatable about said point of convergence in a plane normal to the plane of said wing, rollers carried by said bar at the radially-inner and outer ends of said part, said rollers coaxial with said cutter and engaged with cam surfaces provided on said structure so as to oscillate said bar in said normal plane as said structure is oscillated whereby to constrain the cutter to machine said part in the chordwise direction to a tapering aerofoil section.

References Cited in the file of this patent

UNITED STATES PATENTS

| | | |
|---|---|---|
| 1,925,025 | Amann | Aug. 29, 1933 |
| 2,113,716 | Berliner | Apr. 12, 1938 |
| 2,321,441 | Webber | June 8, 1943 |
| 2,424,031 | Heer | July 15, 1947 |
| 2,524,091 | Von Zimmermann | Oct. 3, 1950 |
| 2,664,122 | Allen | Dec. 29, 1953 |